United States Patent
Lee et al.

(10) Patent No.: US 6,769,391 B1
(45) Date of Patent: Aug. 3, 2004

(54) FOUR-STROKE ENGINE WITH AN OIL SPRAY GENERATING ASSEMBLY FOR LUBRICATION

(75) Inventors: Andy Lee, Taichung (TW);
Shaw-Liung Teng, Taichung Hsien (TW)

(73) Assignee: ECI Engine Co., Ltd., Taichung (TW)

( * ) Notice: Subject to any disclaimer, the term of this patent is extended or adjusted under 35 U.S.C. 154(b) by 0 days.

(21) Appl. No.: 10/411,230

(22) Filed: Apr. 11, 2003

(51) Int. Cl.$^7$ ............................................. F01M 1/06
(52) U.S. Cl. ..................................................... 123/196 R
(58) Field of Search ........................ 123/196 R, 196 S, 123/196 CP

(56) References Cited

U.S. PATENT DOCUMENTS

| | | | | |
|---|---|---|---|---|
| 5,860,403 A | * | 1/1999 | Hirano et al. ........... | 123/196 R |
| 5,960,764 A | * | 10/1999 | Araki .................... | 123/196 R |
| 6,283,084 B1 | * | 9/2001 | Nagai et al. ............ | 123/196 R |
| 6,332,440 B1 | * | 12/2001 | Nagai et al. ............ | 123/90.31 |
| 6,378,396 B1 | * | 4/2002 | Reinhardt et al. ....... | 74/595 |
| 6,394,061 B2 | * | 5/2002 | Ryu et al. .............. | 123/196 R |
| 6,422,194 B2 | * | 7/2002 | Ito et al. ............... | 123/196 R |
| 6,484,679 B2 | * | 11/2002 | Ito et al. ............... | 123/90.31 |
| 6,494,176 B2 | * | 12/2002 | Ito et al. ............... | 123/196 R |
| 6,510,829 B2 | * | 1/2003 | Ito et al. ............... | 123/196 R |
| 6,530,355 B2 | * | 3/2003 | Ito et al. ............... | 123/196 R |
| 6,554,104 B2 | * | 4/2003 | Ohyama et al. ......... | 184/6.28 |

* cited by examiner

*Primary Examiner*—Henry C. Yuen
*Assistant Examiner*—J A Benton
(74) *Attorney, Agent, or Firm*—Fei-Fei Chao; Venable LLP

(57) ABSTRACT

A four-stroke internal combustion engine includes a crankcase with a bottom, an oil pan and an oil spray generating assembly. The oil spray generating assembly having a closed sidewall, a valve, a bottom cap and nozzles is attached to the bottom of the crankcase and is enclosed by the oil pan. The closed sidewall is formed at the bottom of the crankcase to define a mist chamber enclosed by the bottom cap. The valve is mounted in the mist chamber with a valve port defined through the crankcase and a resilient valve flap corresponding to the valve port attached to the bottom of the crankcase. The nozzles are respectively mounted in the bottom cap out of the mist chamber inside the closed sidewall. The operation of the engine will produce an oil vapor for lubrication with the lubricating oil flowing out of the nozzles.

5 Claims, 6 Drawing Sheets

FOUR-STROKE ENGINE WITH AN OIL SPRAY GENERATING ASSEMBLY FOR LUBRICATION

BACKGROUND OF THE INVENTION

1. Field of the Invention

The present invention relates to a four-stroke engine, and more particularly to a four-stroke internal combustion engine with an oil spray generating assembly to produce oil spray for lubrication.

2. Description of Related Art

Four-stroke internal combustion engines were developed over one hundred years ago, to power machines that do a specific job and comprise a block, a cylinder, a piston, a crankcase and a cylinder head. The cylinder is formed in the block. The piston is movably mounted and moves reciprocally in the cylinder and has a piston head and a connecting rod. The connecting rod has a top end and a bottom end, and the top end is pivotally connected to the piston head. The crankcase is attached to the block and includes a bottom, a crankshaft and an oil pan. The crankshaft is rotatably mounted in the crankcase, and the bottom end of the connecting rod is attached rotatably to the crankshaft. Therefore, the reciprocating motion of the piston in the cylinder causes the crankshaft to rotate. The oil pan is a reservoir to hold lubricating oil and is attached to the bottom of the crankcase.

However, friction is created during the operation of the piston and the crankshaft. The friction generates heat that will cause the engine to breakdown unless the friction and resultant heat are limited. Lubrication of the piston and the crankshaft in the engine is the most important means of limiting friction and the resultant heat when the engine is running. Lubricants such as lubricating oil are extensively used to lubricate moving parts in an engine. A forced lubrication system in an engine uses lubricating oil spray or vapor in addition to the lubricating oil to lubricate moving parts in an internal combustion engine.

A conventional method to produce the oil vapor uses an agitating rod or slinger ring to agitate the lubricating oil in the oil pan. The agitating rod is attached to the bottom end of the connecting rod and rotates with the crankshaft. The rotation of the agitating rod agitates the lubricating oil in the oil pan and generates an oil vapor for lubrication. However, the oil pan must be large enough to accommodate the agitating rod used to agitate the oil. Specifically, the oil pan must have a depth greater than the combined length of the agitating stick and the offset of the crank on the crankshaft.

Furthermore, the exhaust in the exhausting stroke of the engine contains water vapor and lubricating oil droplets in addition to other exhaust gases. If the water vapor is not separated from the lubricating oil droplets, the lubricating oil droplets will be recycled with water vapors, and the water vapors will rust or oxidize the engine.

To overcome the shortcomings, the present invention provides a four-stroke internal combustion engine with an oil spray generating assembly and an oil recycling assembly to mitigate or obviate the aforementioned problems.

SUMMARY OF THE INVENTION

The main objective of the invention provides a four-stroke internal combustion engine with an oil spray generating assembly, which has a simple feature to produce oil vapor or spray for lubrication.

Also, another objective of the invention is to provide a four-stroke internal combustion engine with an oil recycling assembly that will separate oil droplets and water vapor, and collect the separated lubricating oil and recycle the lubricating oil to the oil pan of the engine.

Other objectives, advantages and novel features of the invention will become more apparent from the following detailed description when taken in conjunction with the accompanying drawings.

DETAILED DESCRIPTION OF PREFERRED EMBODIMENT

Figure 1:
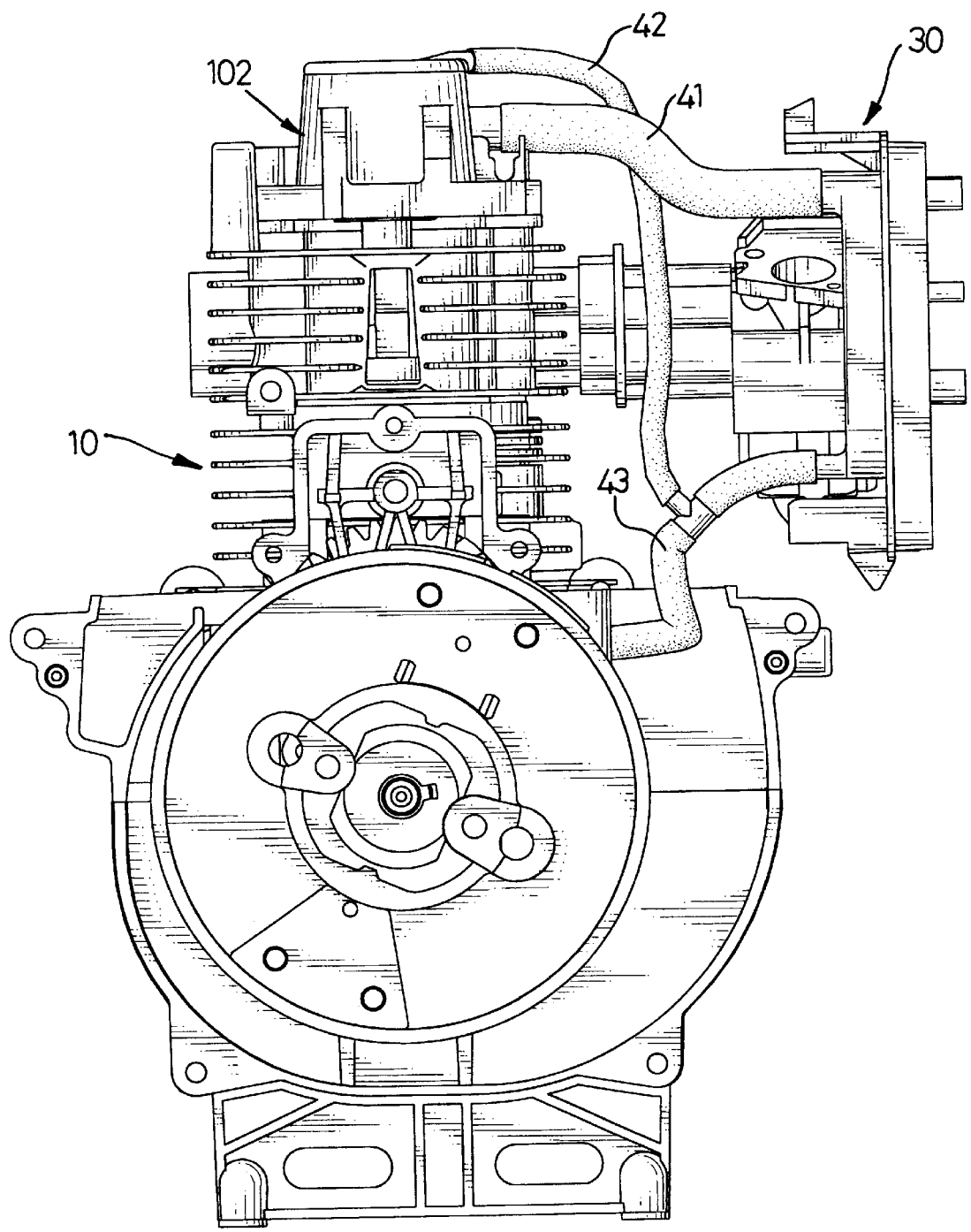
FIG. 1 is a front plan view of a four-stroke internal combustion engine in accordance with the present invention.
Figure 2:
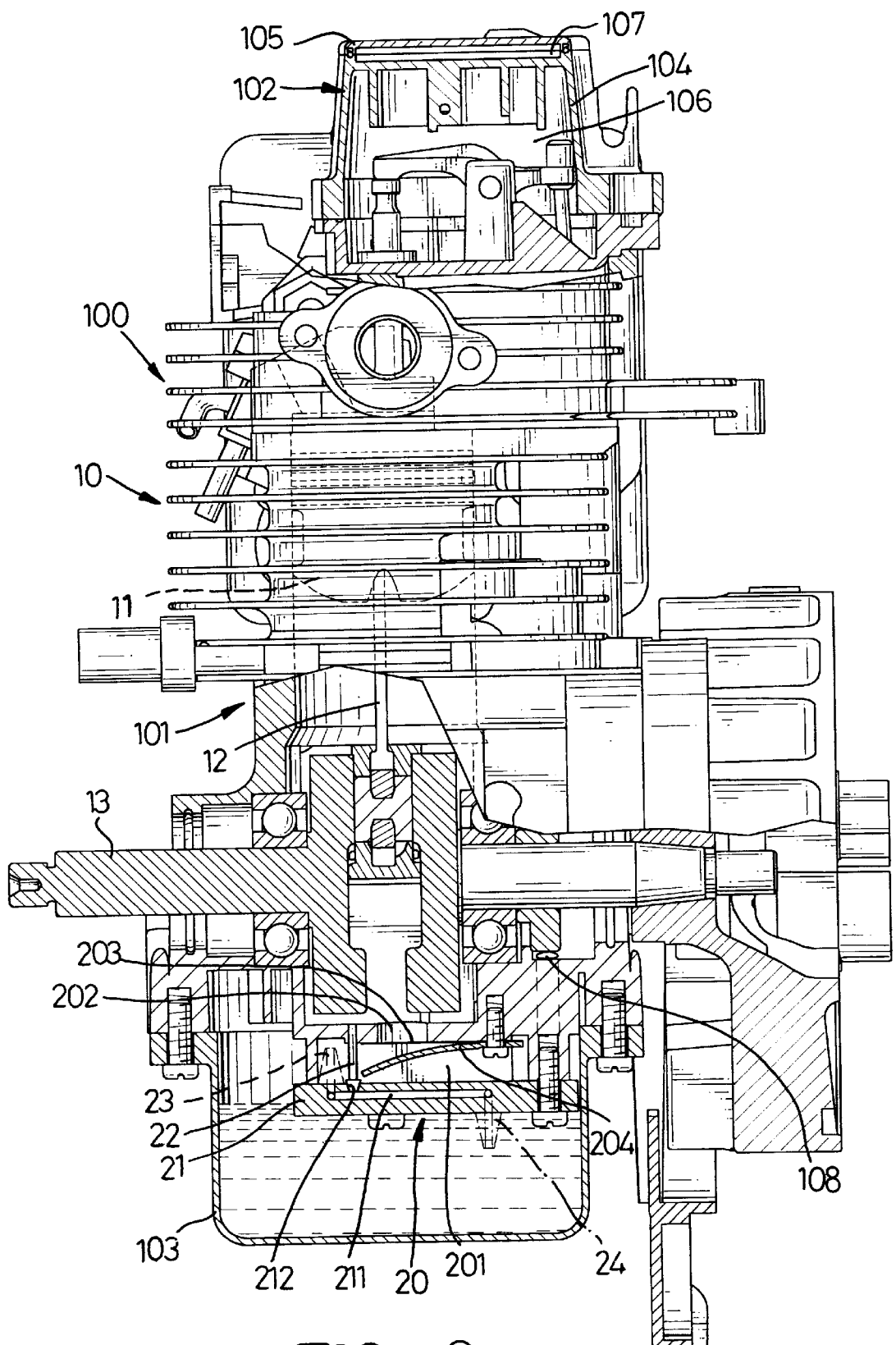
FIG. 2 is a right side plan view in partial section of the engine in FIG. 1.

With reference to FIGS. 1 and 2, an internal combustion four-stroke engine in accordance with the present invention comprises an engine body (10), an oil spray generating assembly (20), an oil recycling assembly (30) and multiple connecting ducts (not numbered).

The engine body (10) has a block (100), a crankcase (101), a head (102) and an oil pan (103). The block (100) has a top (not numbered), a bottom (not numbered), a cylinder (not numbered), a piston (11) and a cylinder oil channel (not shown). The cylinder is formed in the block (100). The piston (11) is reciprocally mounted in the cylinder. The piston (11) will reciprocally move in the cylinder between two positions, called top-dead-center (TDC) and bottom-dead-center (BDC). One complete cycle of the piston (11) consists of a downward power stroke, an upward exhaust stroke, a downward intake stroke and an upward compression stroke. The cylinder oil channel is defined in the block (101) through the bottom and communicates with the cylinder at a position above top-dead-center.

The crankcase (101) is attached to the bottom of the block (100) and is adapted to rotatably mount a crankshaft (13) and to attach a connecting rod (12) to the crankshaft (13) and the piston (11). The crankcase (101) has a bottom (not numbered), an inner chamber (not numbered), two opposite sides (not numbered) and an oil channel (108). The crankshaft (13) is rotatably mounted in the inner chamber of the crankcase (101) and has an outside end (not numbered). The connecting rod (12) connects the piston (11) to the crankshaft (13). The outside end of the crankshaft (13) extends out of the crankcase (101). The oil channel (108) is defined through the bottom of the crankcase (101) and communicates with the cylinder oil channel in the block (100). Since the piston (11) rotates the crankshaft (13) conventionally, no further description is provided of the operation of the piston (11) and the crankshaft (13).

The head (102) is attached to the top of the block (100) and has a head cover (104), a first connecting duct (41), a second connecting duct (42) and an end cap (105). The head cover (104) has a top (not numbered), an outlet (not numbered) an inner chamber (106), and multiple orifices (not shown) and is attached to the top of the block (100). The orifices are formed in the top of the head cover (104). The first connecting duct (41) has an inner end (not numbered) and an outer end (not numbered), and the inner end is connected to the outlet in the head cover (104). The second connecting duct (42) has an inner end (not numbered) and an outer end (not numbered). During the exhaust stroke of the piston (11), the burned gases and other substances such as lubricating oil spray are exhausted into the inner chamber (106) of the head cover (104) of the head (102). The exhaust gases in the inner chamber (106) exhausted out of the head cover (104) through the outlet.

The end cap (105) has an oil outlet (not numbered), is attached to the top of the head cover (104) over the orifices and forms a transverse channel (107) between the top of the head cover (104) and the end cap (105). The transverse channel (107) communicates with the inner chamber (106) in the head cover (104) through the orifices. The inner end of the second connecting duct (42) connected to the end cap (105). The oil pan (103) is attached to the bottom of the crankcase (101) and has an inner chamber (not numbered) to hold lubricant such as lubricating oil.

Figure 3:
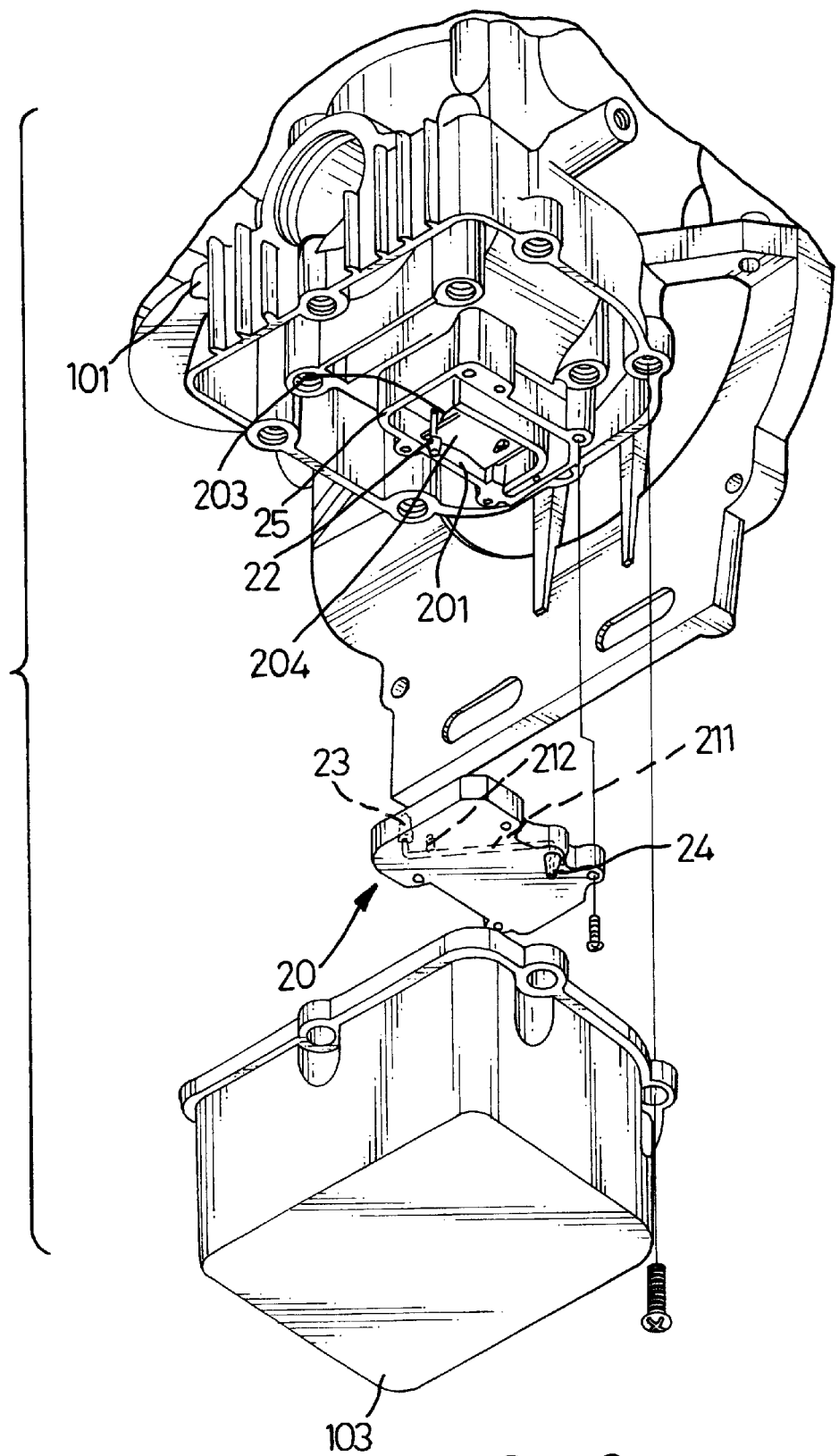
FIG. 3 is an enlarged exploded perspective view of an oil spray generating assembly of the lubrication system in FIG. 1.
Figure 6:
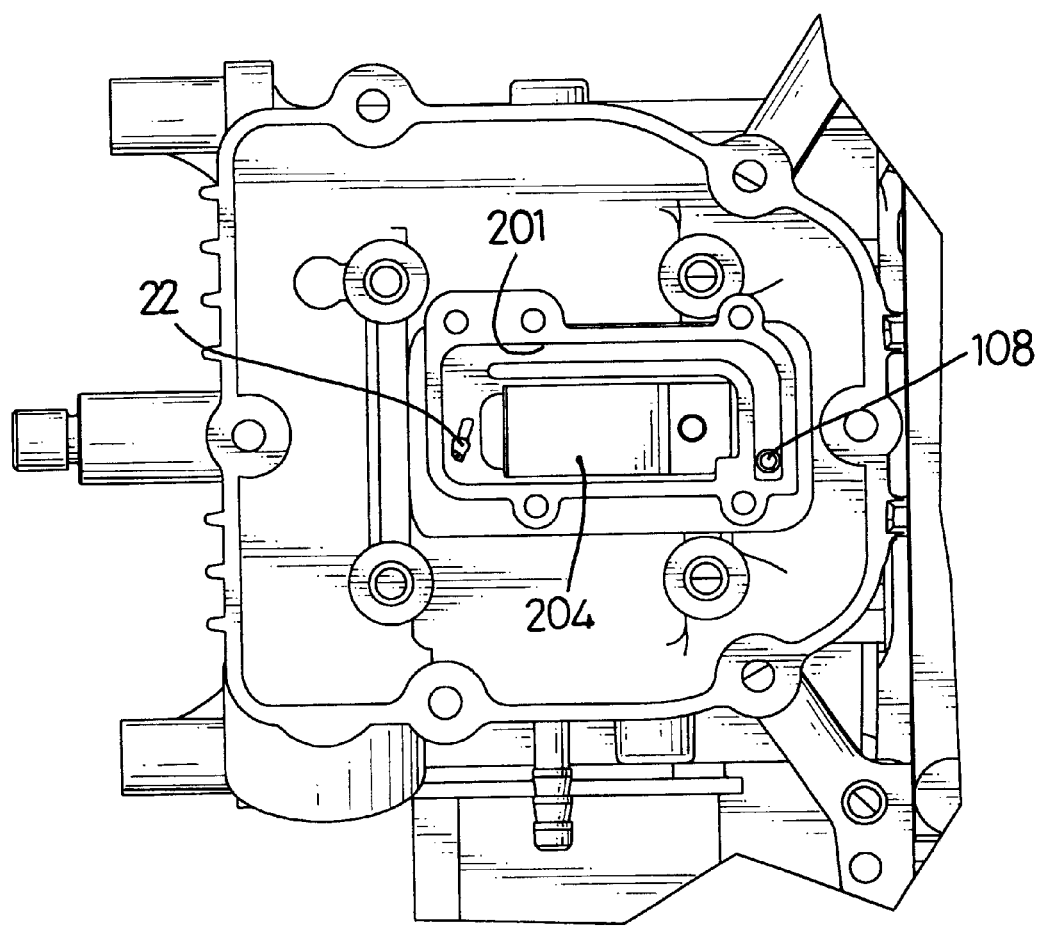
FIG. 6 is a bottom plan view of the crankcase of the engine in FIG. 1 with the oil spray generating assembly.

With reference to FIGS. 2, 3 and 6, the oil spray generating assembly (20) is attached to the bottom of the crankcase (101) in the inner chamber of the oil pan (103) to produce oil spray or vapor. The oil spray generating assembly (20) comprises a valve (not numbered), a bottom cap (21), a connecting tube (22), an upper nozzle (23), a lower nozzle (24) and a closed sidewall (25). The closed sidewall (25) is formed at and protrudes from the bottom of the crankcase (101) to define a mist chamber (201) that communicates with the oil channel (108) in the crankcase (101). The valve is mounted in the bottom of the crankcase (101) in the mist chamber (201) and comprises a valve port (202), a resilient valve flap (203) and a curved limiting stop (204). The valve port (202) is defined through the bottom of the crankcase (101) between the inner chamber in the crankcase (101) and the mist chamber (201). The valve flap (203) is attached to the bottom of the crankcase (101) corresponding to the valve port (202) and selectively covers the valve port (201) to close the valve. The curved limiting stop (204) is attached to the bottom of the crankcase (101) corresponding to the valve flap (203) and limits maximum deformation of the valve flap (203).

The bottom cap (21) is attached to the closed sidewall (25) to enclose the mist chamber (201). The bottom cap (21) has a top (not numbered), a bottom (not numbered), a transverse channel (211) and a vertical channel (212). The transverse channel (211) is defined in the bottom cap (21) between the top and the bottom. The vertical channel (212) is defined through the top of the bottom cap (21) and communicates with the transverse channel (211). The upper nozzle (23) is mounted in the top of the bottom cap (21) and communicates with the transverse channel (211). The lower nozzle (24) is mounted in the bottom of the bottom cap (21) and communicates with the transverse channel (211). Both the upper and the lower nozzles (23, 24) are positioned out of the mist chamber (201) that is inside the closed sidewall (25).

The connecting tube (22) is mounted in the mist chamber (201) and has a top end (not numbered) and a bottom end (not numbered). The top end of the connecting tube (22) passes through the bottom of the crankcase (101). The bottom end of the connecting tube (22) is connected to the vertical channel (212) at the top of the bottom cap (21). So, the connecting tube (22) connects between the inner chamber of the crankcase (101) and the transverse channel (211) in the bottom cap (21). The oil spray generating assembly (20) is mounted in the oil pan (103) with one of the two nozzles (23, 24) in the lubricating oil at a time.

Figure 5:
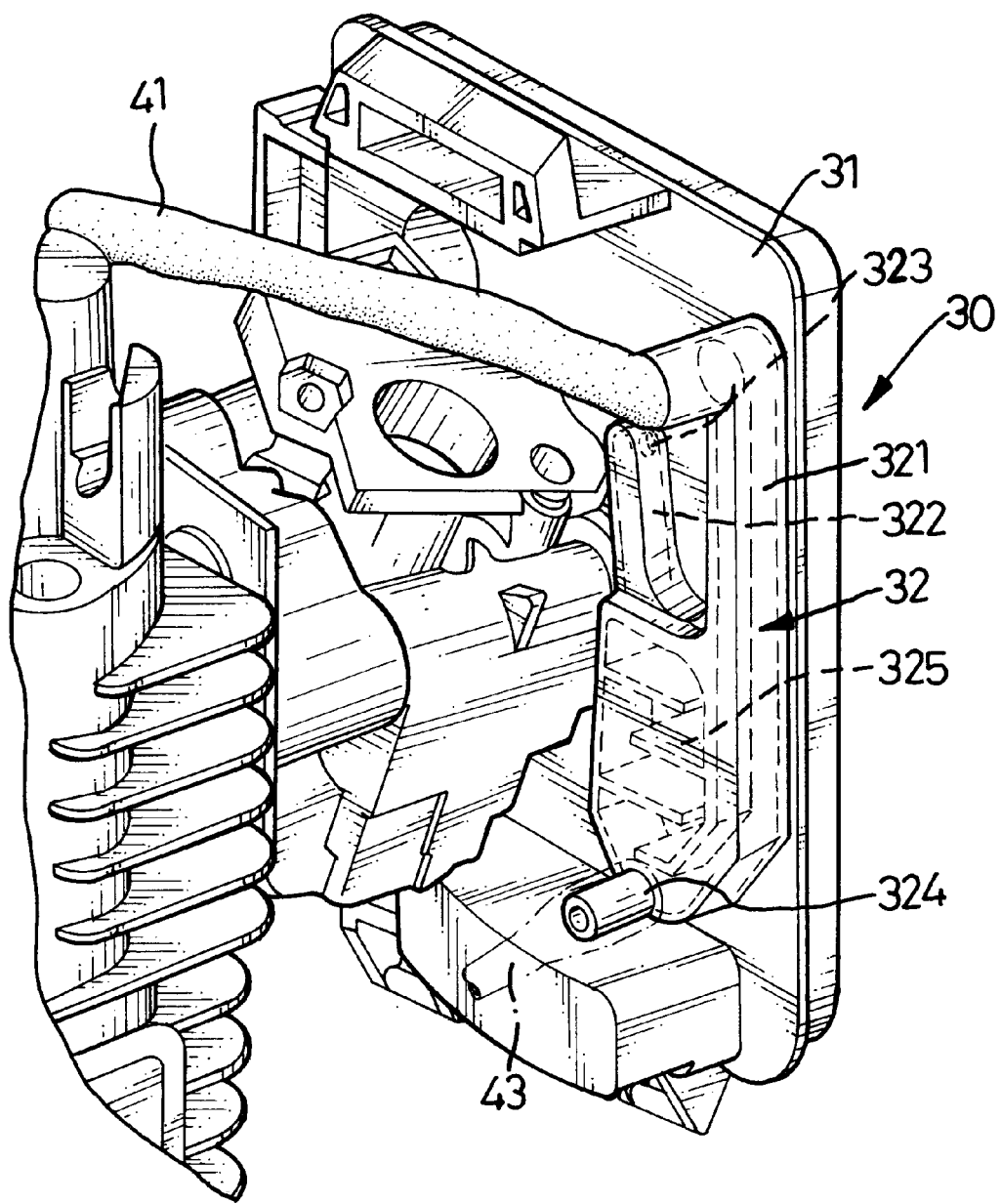
FIG. 5 is a perspective view of an oil recycling assembly of the engine in FIG. 1.

With reference to FIGS. 1 and 5, the recycling assembly (30) is attached to the block (100) and communicates with the inner chambers in both the head cover (104) and the crankcase (101). The recycling assembly (30) comprises a bracket (31) and a recycling device (32). The bracket (31) connects the recycling device (32) to the block (100) of the engine body (10). The recycling device (32) has a casing (321) and a laminar separator (325). The casing (321) has an exhaust inlet (not numbered), an oil outlet (324), an exhaust port (323) and an inner passage (322). The exhaust inlet is connected to the outer end of the first connecting duct (41) to direct the exhaust gases into the casing (321). The oil outlet (324) is connected to an oil recycling duct (43) that communicates with the inner chamber of the crankcase (101) and the second connecting duct (42) through a T-shaped connector (not numbered). The laminar separator (325) is formed in the casing (321) except for the inner passage of the casing (321).

With reference to FIG. 2, the piston (11) moves toward the drive shaft (13) during the intake stroke. The movement of the piston (11) will compress the air in the inner chamber of the crankcase (101). The compression of the air produces a positive pressure in the inner chamber of the crankcase (101). The positive pressure will create a force that pushes the valve flap (203) toward the curved limiting stop (204). The compressed air passes into the connecting tube (22) and flows out of the two nozzles (23, 24) to produce an oil spray. A portion of the compressed air will flow into the oil channel (108) and flow into the cylinder above the top-dead-center position of the piston.

Next, the piston (11) moves into the compression stroke as it moves toward the top-dead-center position. The movement of the piston (11) will create a negative differential pressure in the inner chamber of the crankcase (101). The negative differential pressure will produce an attraction force that attracts the valve flap (203) and causes the valve flap (203) to cover the valve port (202). Part of the oil spray and oil will be trapped in the inner chamber of the crankcase (101) and lubricate the mechanical elements. In the power stroke, the piston (11) is driven toward the crankshaft (13) by expanding combustion gasses. The movement of the piston (11) causes pressure phenomenon in the oil pan (103) and crankcase (101) previously described in the intake stroke. Also, the compressed air flows into the oil guide (108) and carries some oil spray into the cylinder to lubricate the cylinder before the repeated intake stroke occurs.

Finally, during the exhaust stroke, burned gases including the oil spray, water vapor and other gasses will be exhausted into the casing (321) of the oil recycling assembly (30). The burned gases will flow into the inner passage (322) and pass through the laminar separator (325). The light water vapor and burned gases will flow out of the casing (321) through the exhaust port (323). The heavier oil spray will collect on the laminar separator (325) and transform into oil drops that will flow back to the inner chamber of the crankcase (101) through the oil recycling duct (43). The lubricating oil is recycled without any water vapor.

Figure 4:
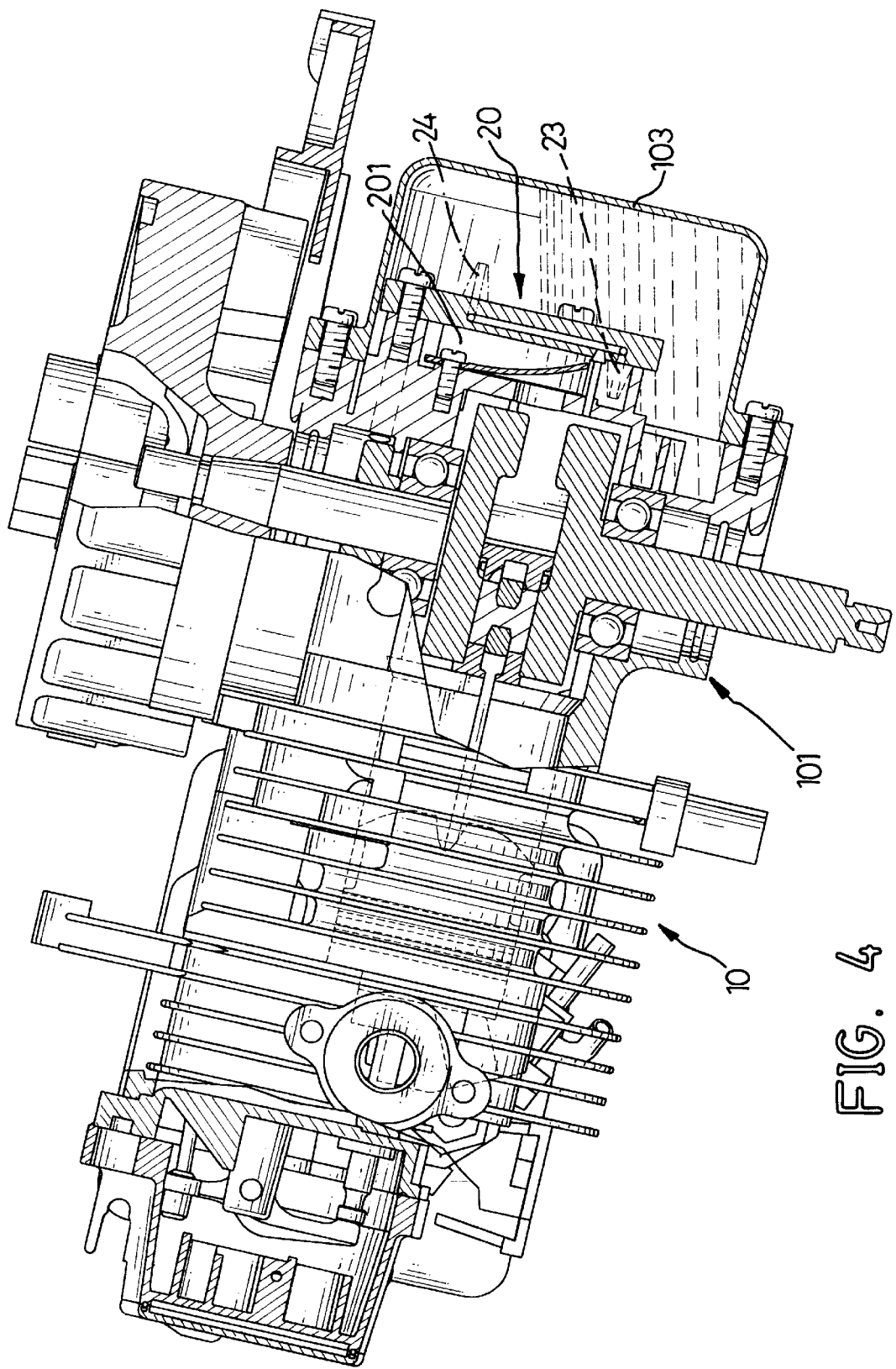
FIG. 4 is an operational cross sectional right side plan view of the engine in FIG. 1 when the engine is tilted.

With reference to FIG. 4, one of the nozzles (23, 24) will be in the oil even when the engine (10) is tilted. Such a feature always allows the lubricating oil in the oil pan (103) to be drawn into the inner chamber of the crankcase (101) to produce the oil spray for lubrication. Consequently, the engine (10) will operate at any required orientation.

When the engine is used in an upside-down orientation, a portion of both the lubricating oil and the oil spray that lubricates the cylinder will flow into the inner chamber (106) of the head cover (104). The apertures on the top of the head cover (104) will allow the lubricating oil to flow into the transverse channel (107). The lubricating oil will directly flow into the inner chamber of the crankcase (101) from the second and the oil recycling ducts (42, 43) for recycling.

The present invention replaces a conventional oil pump in a four-stroke internal combustion engine with a simple oil spray generating assembly (20). Since the oil pan (103) can be smaller than one used in a conventional internal combustion engine, the engine body (10) can be smaller. Moreover, the recycling assembly (30) separates the lubricating oil from the exhaust gases and recycles the used lubricating oil. Impurities will be kept out of the recycled lubricating oil.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A four-stroke internal combustion engine comprising:
    an engine body having
        a block having a top, a bottom, a cylinder and a piston reciprocally mounted in the cylinder;
        a head formed at the top of the block;
        a crankcase formed at the bottom of the block and having a bottom, an inner chamber, a crankshaft rotatably mounted in the inner chamber of the crankcase and a connecting rod connecting the piston to the crankshaft for rotating the crankshaft with the reciprocal movement of the piston relative to the cylinder; and
        an oil pan attached to the bottom of the crankcase and having an inner chamber to hold lubricating oil;
    an oil spray generating assembly attached to the bottom of the crankcase in the inner chamber of the oil pan to produce oil spray for lubrication and the oil spray generating assembly comprising
        a closed sidewall formed at the bottom of the crankcase to define a mist chamber;
        a valve mounted in the bottom of the crankcase in the mist chamber and comprising
            a valve port defined through the bottom of the crankcase and communicating with the inner chamber of the crankcase and the mist chamber;
            a resilient valve flap attached to the bottom of the crankcase corresponding to the valve port to selectively cover the valve port; and
            a curved limiting stop attached to the bottom of the crankcase corresponding to the valve flap to limit maximum deformation of the valve flap;
        a bottom cap attached to the closed wall to enclose the mist chamber and having
            a top;
            a bottom;
            a transverse channel defined in the bottom cap between the top and the bottom; and
            a vertical channel defined through the top of the bottom cap and communicating with the transverse channel;
        an upper nozzle mounted in the top of the bottom cap out of the mist chamber and communicating with the transverse channel;
        lower nozzle mounted in the bottom of the bottom cap out of the mist chamber and communicating with the transverse channel; and
        a connecting tube mounted in the mist chamber and having a top end and a bottom end, the top end of the connecting tube passing through the bottom of the crankcase and the bottom end of the connecting tube connected to the vertical channel at the top of the bottom cap to communicate with the inner chamber of the crankcase and the transverse channel in the bottom cap; and
    an oil recycling assembly attached to the block of the engine body to recycle the oil spray exhausted out of the cylinder.

2. The four-stroke engine as claimed in claim 1, wherein the oil recycling assembly comprises
    a bracket connected to the block of the engine body;
    a recycling device mounted in the bracket and having
        a casing mounted in the bracket and having an exhaust inlet, an oil outlet, an exhaust port and an inner passage; and
        a laminar separator mounted in the casing to separate lubricating oil from exhaust gases; and
    an oil recycling duct is connected to the oil outlet of the casing and communicating with the inner chamber of the oil pan.

3. The four-stroke engine as claimed in claim 2, wherein the head comprises
    a head cover attached to the top of the block and having an outlet and an inner chamber adapted for receiving burned gases exhausted from the cylinder;
    an end cap attached to the top of the head cover and having an oil outlet;
    a transverse channel formed between the top of the head cover and the end cap and communicating with both the inner chamber in the head cover and the oil outlet of the end cap; and
    multiple apertures defined through the top of the head cover and communicating with the transverse channel and the inner chamber of the head cover; and
    a first connecting duct is connected the outlet of the head cover to the exhaust inlet of the casing for exhausting burned gases into the casing; and
    a second connecting duct is connected to the oil outlet in the end cap to communicate with both the transverse channel and the oil recycling duct by means of a T-shaped connector.

4. The four-stroke engine as claimed in claim 1, wherein
    a cylinder oil channel is formed in the block through the bottom to lubricate the cylinder; and
    an oil channel is defined through the bottom of the crankcase and communicates with the cylinder oil channel in the block and the mist chamber.

5. The four-stroke engine as claimed in claim 3, wherein
    a cylinder oil channel is formed in the block through the bottom to lubricate the cylinder; and
    an oil channel is defined through the bottom of the crankcase and communicates with the cylinder oil channel in the block and the mist chamber.

* * * * *